United States Patent
Shah

(10) Patent No.: US 7,136,952 B2
(45) Date of Patent: Nov. 14, 2006

(54) METHOD FOR PROGRAMMING FIRMWARE HUBS USING SERVICE PROCESSORS

(75) Inventor: Mehul Shah, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 250 days.

(21) Appl. No.: 10/833,417

(22) Filed: Apr. 28, 2004

(65) Prior Publication Data

US 2005/0246473 A1    Nov. 3, 2005

(51) Int. Cl.
*G06F 13/14* (2006.01)

(52) U.S. Cl. .................................. 710/305; 714/31
(58) Field of Classification Search ............. 710/305; 714/31; 711/203; 703/28; 713/2
See application file for complete search history.

(56) References Cited

U.S. PATENT DOCUMENTS

| | | | |
|---|---|---|---|
| 6,185,523 B1 * | 2/2001 | Itskin et al. ................... 703/28 |
| 6,263,373 B1 | 7/2001 | Cromer et al. ............. 709/250 |
| 6,301,656 B1 | 10/2001 | Streett et al. ................... 713/2 |
| 6,480,966 B1 | 11/2002 | Rawson, III ................ 713/400 |
| 6,567,897 B1 * | 5/2003 | Lee et al. ................... 711/153 |
| 6,598,157 B1 | 7/2003 | McKee ........................... 713/1 |
| 6,918,027 B1 * | 7/2005 | Mantey et al. ................ 712/37 |
| 6,948,147 B1 * | 9/2005 | New et al. ..................... 716/16 |
| 6,968,477 B1 * | 11/2005 | Mehta et al. .................. 714/31 |
| 2002/0087652 A1 | 7/2002 | Davis et al. ................. 709/213 |
| 2002/0091807 A1 | 7/2002 | Goodman .................... 709/221 |
| 2003/0009654 A1 | 1/2003 | Nalawadi et al. .............. 713/1 |
| 2003/0037224 A1 | 2/2003 | Oehler et al. ................. 712/29 |
| 2003/0041182 A1 | 2/2003 | Martwick ....................... 710/1 |
| 2003/0065893 A1 | 4/2003 | Lary et al. ................... 711/147 |
| 2003/0069711 A1 | 4/2003 | Ahrens, Jr. et al. ......... 702/127 |
| 2003/0163753 A1 | 8/2003 | Lu et al. ........................ 714/2 |

FOREIGN PATENT DOCUMENTS

EP    381645 A2 *   8/1990
EP    566263 A2 *   10/1993

* cited by examiner

*Primary Examiner*—Paul R. Myers
(74) *Attorney, Agent, or Firm*—Lieberman & Brandsdorfer, LLC

(57) ABSTRACT

A method and system that enables a service processor to program a system resource. The service processor uses a JTAG Bus to request a system processor to enter into probe mode. Once in probe mode, the service processor sends a signal with instructions to the system processor. Upon execution of the instructions by the system processor, the executed instructions are forwarded to the appropriate address through a host bus and a controller. The service processor may forward instructions to any system resource through the system processor.

19 Claims, 3 Drawing Sheets

METHOD FOR PROGRAMMING FIRMWARE HUBS USING SERVICE PROCESSORS

BACKGROUND OF THE INVENTION

1. Technical Field

This invention relates to non-volatile memory. More specifically, the invention relates to accessing non-volatile memory by a service processor.

2. Description of the Prior Art

Modern computer systems typically have firmware stored in the non-volatile memory. Non-volatile memory is a category of memory that holds their content without electrical power and includes read-only memory (ROM), programmable ROM (PROM), erasable and programmable ROM (EPROM), and electrically erasable and programmable ROM (EEPROM) technologies. The firmware may include the basic input/output system (BIOS) of the computer system. The BIOS is a set of routines in a computer which provides an interface between the operating system and the hardware. Typically, the BIOS supports all peripheral technologies and internal services.

FIG. 1 is a prior art block diagram (10) of a chipset architecture of a sample node of a multinode shared memory multiprocessor system. Such systems offer a common physical memory address space that all processors can access. Multiple processes therein, or multiple threads within a process, can communicate through shared variable in memory because the system allows the processes to read or write to the same memory location in the computer system. Firmware or other non-volatile memory in this chipset architecture is located behind each of two different bridge controllers of the architecture, so that in order to access either of the firmware hubs the process must interface with a controller associated with the respective hub. One of the bridge controllers, commonly referred to as the north bridge controller (22), is the controller for the host bus (20) that interfaces between the system processors (CPUs) (12), (14), and (16) of the multiprocessor system and the north firmware hubs (24), which are known in the art to include high speed components, such as memory, accelerated graphics port bus, and the Peripheral Interconnect (PCI) bus. The other bridge controller, commonly referred to as the south bridge controller (32), stems from the I/O bus (30) and the I/O bridge (26), and is the controller that interfaces the service processor (28) and the south firmware hubs (34), which are known to include Integrated Drive Electronics (IDE) drives and lower speed ports, such as Universal Serial Bus (USB) ports, serial ports, audio ports, etc. Each node in a multi-node computer systems commonly has a service processor (28) that interfaces with the south bridge controller (32). The service processor (28) is also connected to central processing units (12), (14), and (16) via a JTAG bus, also known as an IEEE 1149.1 Standard Test Access Port (18). The service processor (28) is typically responsible for handling maintenance and other service related tasks for its node.

A problem associated with this chipset architecture is that the service processor of a node only has access to system resources located on the south bridge side of the node. The system resources located on the north bridge side of the node are inaccessible to the components located behind the south bridge controller, which prevents the service processor from accessing those resources. Therefore, the service processor cannot maintain the system resources located behind the north bridge controller. This can be problematic in situations where the service processor is responsible for firmware located behind the north bridge controller. In addition, firmware hub interfaces of both the north bridge controller and the south bridge controller may be operating at different speeds based upon requirements of the ports in the associated firmware hubs and controllers. Accordingly, a hardware solution which includes modifying the system architecture to include a multiplexer is required to address the operating speeds of the firmware hubs while enabling communication from the service processor.

One prior art solution, U.S. Patent Publication 2003/0065893 to Lary et al., uses multiplexing hardware incorporated into the chipset architecture to enable firmware access by the service processor. More specifically, this publication has two multiplexers to multiplex the low pin count (LPC) bus clock, and data and control signals using transistors, such as field effect transistors (FETs). The multiplexers are controlled by the service processor and provide access to any desired firmware hub via an accessible firmware hub interface.

However, there are limitations associated with what is disclosed in the Lary et al. publication. For example, it utilizes a hardware solution that requires adding two multiplexers to the chipset architecture, a first multiplexer for a north firmware hub and a second multiplexer for a south firmware hub. There is therefore a need for a software solution to enable the service processor to access the north and south firmware hubs, without the need for a hardware modification to the chipset.

SUMMARY OF THE INVENTION

This invention comprises a method and system to provide the service processor with access to system resources.

In one aspect of the invention, a method is provided for managing a system resource. A node is provided with one or more system processors, a service processor, and a system resource. A control signal is communicated from the service processor to the system resource through one of the system processors. The control signal represents an access demand by the service processor to the system resource.

In another aspect of the invention, a computer system is provided having a node with at least one host processor, a service processor, and at least one system resource. A manager is provided to communicate a control signal from the service processor to the system resource through one of the system processors. The control signal represents an access demand to the system resource.

In yet another aspect of the invention, an article is provided with a computer-readable signal-bearing medium. A node is provided in the medium, with the node having at least one system processor, a service processor, and a system resource. Means in the medium are provided for communicating a control signal from the service processor to the system resource through one of the system processors.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A node in a multiprocessor computing system is provided with one or more system processors, a service processor, and system resources. Each node in a multinode system is only able to access the system resources in the same node, until nodes are merged together. Uniform access from the service processor to all system resources in a node is provided. The service processor uses a JTAG Bus to communicate instructions from the service processor to a designated system resource, as well as to communicate instructions from the designated system resource to the service processor. The service processor uses the probe mode of the system processor to feed instructions to a system resource using at least one of the system processors as a host. Accordingly, the service processor uses the JTAG Bus as a surrogate to communicate instructions to any of the system resources by means of at least one of the system processors.

Technical Details

Probe mode is commonly used for diagnostic purposes for newly designed motherboards, and In-Circuit Emulator (ICE) support. The probe mode is not a user-accessible operating mode which can-be enabled or disabled through software control. Rather, probe mode is only accessible through a combination of boundary scan registers and dedicated pins. The probe mode registers lie in the boundary scan register space of the Test Access Port (TAP), and are accessible only through the JTAG support pins. While in probe mode, the system processor(s) may examine and modify the internal and external state of a system, memory, and I/O space.

Figure 1:
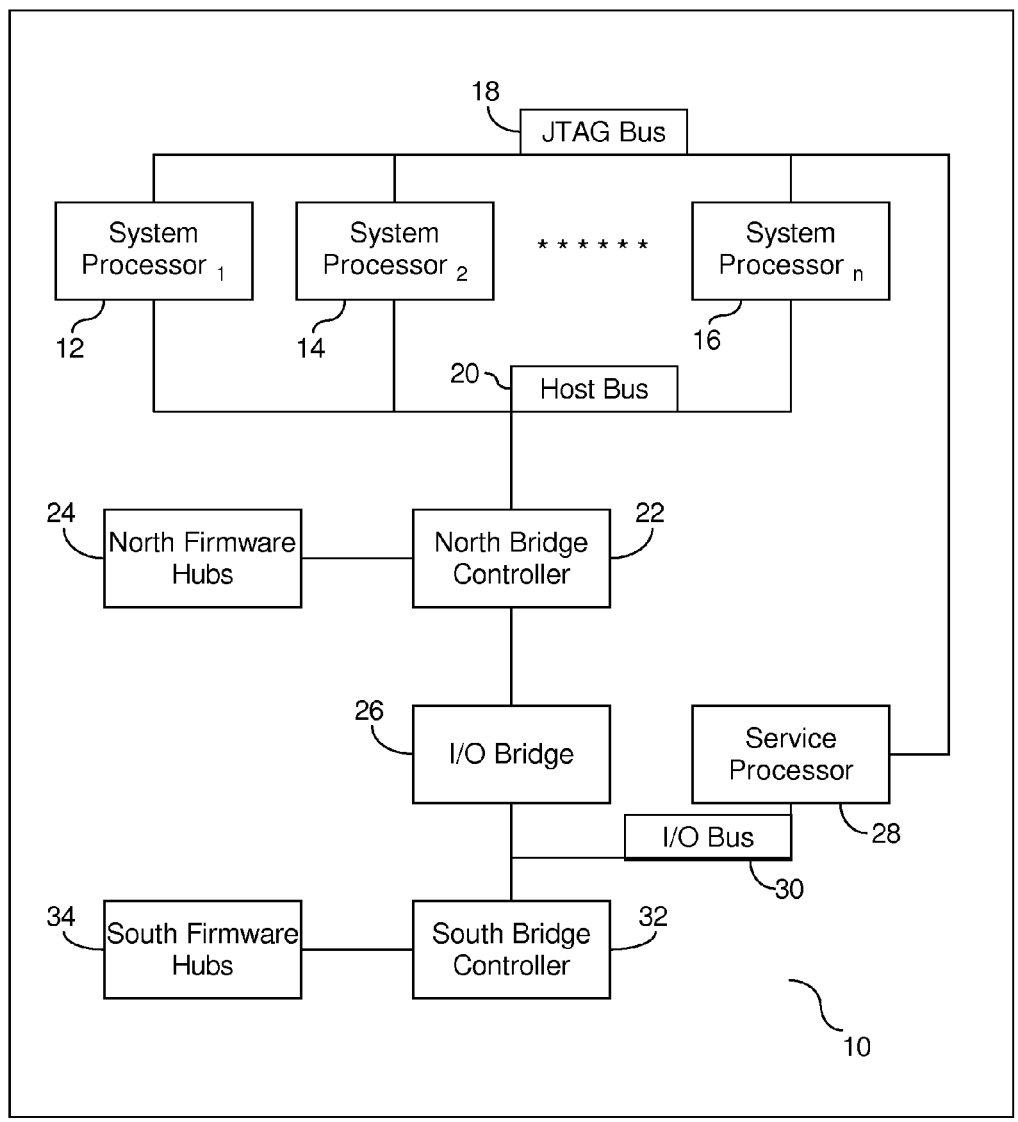
FIG. 1 is a block diagram of a prior art node of a multinode NUMA system.
Figure 2:
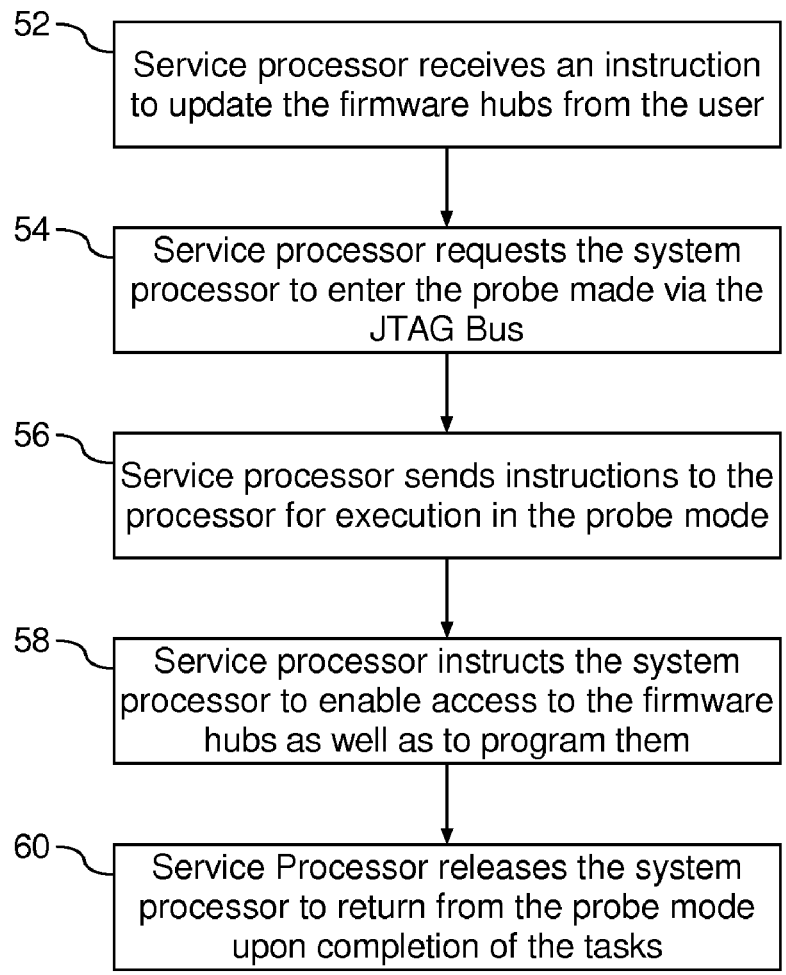
FIG. 2 is flow chart illustrating the flow of communication between the service processor and a system resource according to the preferred embodiment of this invention, and is suggested for printing on the first page of the issued patent.

The next two flow charts will be described in reference to FIG. 1 with the appropriate reference numbers shown. FIG. 2 is a flow chart (50) illustrating the general steps in enabling a service processor (28) to access any system resource in a node. A user sends an instruction to the service processor (28) that requires access to at least one of the system resources (52). The instructions may include an update of the resource. Upon receiving the instruction, the service processor uses the JTAG Bus (18) to request one or more of the system processors (12), (14), (16) to enter the probe mode (54). Once the system processor (12), (14), (16) enters into probe mode, the system processor will wait to receive instructions. The probe mode enables an execution of instructions to change settings in the bridges, as well as fixing any problem in the chipset. The service processor (28) sends instructions to the system processor (12), (14), (16), via the JTAG Bus (18), for execution in probe mode (56). The JTAG Bus (18) scans the instructions to the designated system processor (12), (14), or (16) that is in probe mode and waiting to receive instructions. The instructions from the service processor (28) will typically request that the system processor (12), (14), or (16) enable access to at least one of the system resources, and may include programming instructions (58). Upon completion of the instructions at step (58), the JTAG Bus (18) will scan results of the instruction from the system processor (12), (14), or (16) to the service processor (28). Next, the service processor (28) will release the system processor (12), (14), or (16) from the probe mode (60). Accordingly, any system resource in the node may be indirectly accessed by the service processor through at least one of the system processors.

Figure 3:
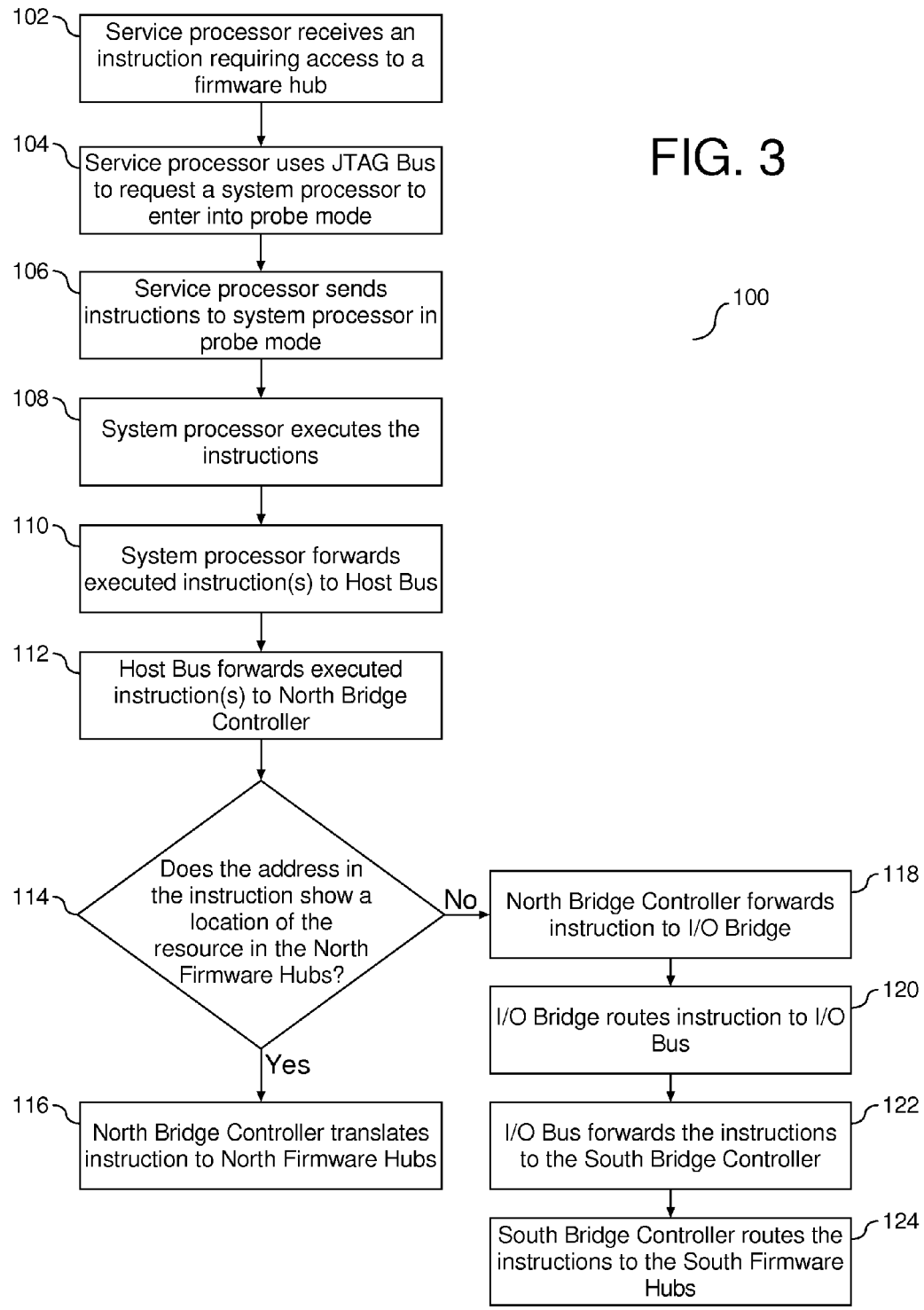
FIG. 3 is a flow chart illustrating an access path from the service processor to a designated system resource.

FIG. 3 is a flow chart (100) illustrating further details of how the service processor (28) accesses a designated system resource. The service processor (28) receives an instruction that requires access to a system resource in at least one of the firmware hubs (24) (34) (102). Each system resource has an address associated therewith to identify its location within the chipset. The service processor (28) uses the JTAG Bus (18) to request that at least one of the system processors (12), (14), or (16) enter a probe mode of operation (104). Once the designated system processor (12), (14), or (16) is in probe mode, the service processor (28) sends instructions to the designated system processor (12), (14), or (16) in probe mode (106). The instructions will have an address to identify the system resource associated with the instruction. Upon receipt of the instructions from the service processor (28), the system processor (12), (14), or (16) executes the instructions (108). Depending upon tie instruction, the system processor (12), (14), or (16) may forward executed instruction, i.e. transaction, to the host bus (110). For example, if the instruction is a read or write to a system resource, the processor will send the transaction to the host bus, as the host bus is responsible for forwarding the transaction to the designated address. The host bus (20) forwards the system processor transaction to the north bridge controller (112), which acts as an interface with the host bus (20) and a north LPC bus (not shown) in communication with the north firmware hubs (24). In effect, the north bridge controller (22) translates connections from access on the host bus (20) to the north LPC bus if the address in the executed instructions indicates a resource located in the north firmware hubs (24). Upon receipt of the executed instructions, the north bridge controller (22) conducts a test to determine if the address indicated in the executed instructions show the location of the resource in the north firmware hubs (114). A positive response to the test at step (114) will enable the north bridge controller (22) to translate the instructions from the host bus (20) to the north LPC bus in communication with the north firmware hubs (24). By using the system processor (12), (14), (16) to access and program the north firmware hubs (24), the communication is out of band, i.e. asynchronous, from the service processor (28) to the system processor (12), (14), (16), and the communication is in band, i.e. synchronous, from the system processor (12), (14), (16) to the north firmware hubs (24). The system processor (12), (14), (16) is not required to have any existing firmware to execute the instructions received from the service processor (28) as the system processor (12), (14), (16) is executing the instructions in probe mode and is functioning as a surrogate to enable communication and programming with system resources. Accordingly, the service processor (28) may indirectly access the north firmware hubs (24) through a communication of instructions in probe mode to one of the system processors (12), (14), or (16) which forwards the instructions through the host bus (20) to the north bridge controller (22).

However, if the response to the test at step (114) is negative, the host bus (20) forwards the system processor (12), (14), (16) executed instructions via the north bridge controller (22), which acts as an interface with the host bus (20), the north bus (not shown) in communication with the north firmware hubs (24), and the I/O Bridge (26). The north bridge controller (22) translates connections from access on the host bus (20) to the I/O Bridge (26) if the address in the executed instructions indicate a resource located in the south firmware hubs (34) (118). By forwarding the instructions to the I/O Bridge (26), this is an indication that the instructions from the service processor (28) request access to a resource in the south firmware hubs (34). As such, the north bridge controller (22) forwards the instruction received from the system processor (12), (14), or (16) via the host bus (20) to the I/O Bridge (26) which routes the instructions to the I/O Bus (30) (120). Following receipt of the instructions, the I/O Bus (30) forwards the instructions to the south bridge controller (32) (122), which routes the instructions to the south firmware hubs (34) via a bus (not shown) associated therewith (124). By using the system processor (12), (14), (16) to access and program a resource in the south firmware hubs (34), the communication is out of band, i.e., asynchronous, from the service processor (28) to the system processor (12), (14), (16), and the communication is in band, i.e. synchronous, from the system processor (12), (14), (16) to the south firmware hubs (34). In addition, the system processor (12), (14), (16) is not required to have any existing firmware to execute the instructions received from the service processor (28) as the system processor (12), (14), (16) is executing the instructions in probe mode and is functioning as a surrogate to enable communication and programming with system resources. Accordingly, the service processor (28) indirectly accesses the south firmware hubs (34) through a communication of instructions in probe mode to one of the system processors (12), (14), (16), which forwards the instructions through the host bus (20) to the south bridge controller (32) via the north bridge controller (22) and the I/O bridge (26).

The service processor (28) can program any of the firmware hubs (24) or (34) in the associated node without having any pre-existing firmware. For example, if the bootstrap code, i.e. the first set of instructions for the system, should become corrupted, the service processor (28) can program the firmware hub containing the bootstrap code without requiring a valid bootstrap code. As indicated in FIG. 1, different firmware hub interfaces commonly operate at different speeds. Either the north firmware hubs (24) or the south firmware hubs (34) may include the bootstrap code, although it is more common to find the bootstrap code in the north firmware hubs (24). Although the speed of the bus associated with the north firmware hubs (24) may be faster than the speed of the bus associated with the south firmware hubs (34), this will no longer be critical since the instructions are being received from the system processor (12), (14), (16) which can access any system resource regardless of the speed of the buses. Accordingly, the use of probe mode in combination with a system processor (12), (14), (16) as a communication host enables effective communication between the service processor (28) and any system resource regardless of the operating speeds of the interfaces in communication with the associated system resource.

Advantages Over the Prior Art

The method and system shown herein enable the service processor (28) to access any system resource without requiring modification to the hardware of the chipset. Although there are hardware solutions that enable the service processor (28) to access the system resource, such solutions must address the speed of the interfaces associated with the north and south firmware hubs (24), (34), respectively. However, since the system processor (12), (14), (16) has access to any system resource regardless of speed of operation of the interfaces, the issue concerning speed of the interfaces becomes moot. The ability for the service processor (28) to use the system processor (12), (14), (16) as a surrogate removes issues associated with hardware modification to the chipset. In addition, the system processor (12), (14), (16) is not required to have any existing firmware, as the system processor (12), (14), (16) functions as a host for instructions to the address indicated by the service processor (28). This eliminates the need to provide recovery code in the firmware hubs (24), (34). Accordingly, the service processor (28) can program existing firmware and/or manage any system resource based upon the existing chipset architecture.

Alternate Embodiments

It will be appreciated that, although specific embodiments of the invention have been described herein for purposes of illustration, various modifications may be made without departing from the spirit and scope of the invention. In particular, the embodiments shown herein are described for accessing and programming one of the firmware hubs. However, the method and system may be applied to read from and/or write to any system resource or any controllers in the system. For example, the service processor may utilize the communication signal to the host processor to modify a system configuration. Accordingly, the scope of protection of this invention is limited only by the following claims and their equivalents.

I claim:

1. A method of managing a system resource comprising:
   (a) providing a node with one or more system processors, a service processor, and at least two system resources, wherein each of said system resources is located behind a respective bridge controller that interface through a bridge; and
   (b) communicating a control signal from said service processor to one of said two system resources via one of said system processors in said node, said control signal representing an access demand by said service processor to one of said system resources, whereby a first bridge controller alternately forwards said signal to a first system resource in communication with said first bridge controller if said signal has an address in said first system resource and a second bridge controller if said signal has an address in said second system resource.

2. The method of claim 1, wherein the step of communicating said control signal from said service processor to a system resource is asynchronous.

3. The method of claim 1, wherein the step of communicating said control signal from said system processor to a system resource is synchronous.

4. The method of claim 1, wherein said system resource is selected from a group consisting of: a north firmware hub, a south firmware hub, a north bridge controller, and a south bridge controller.

5. The method of claim 1, wherein the step of communicating said control signal includes causing one of said system processors to enter into a probe mode of operation.

6. A computer system comprising:
   a node having at least one host processor, at least one service processor, and at least two system resources, wherein said two system resources are located behind a respective bridge controller; and
   a manager adapted to communicate a control signal from said service processor to one of said system resources via one of said system processors, said signal represents an access demand to said system resource whereby a first bridge controller alternately forwards said signal to a first system resources in communication with a first of said bridge controllers if said signal has an address in said first system resource and a second of said bridge controllers if said signal has an address in said second system resource.

7. The system of claim 6, further comprising a probe mode instruction adapted to communicate from said service processor to said system resource.

8. The system of claim 6, wherein said manager communicates said control signal from said service processor to said system resource asynchronously.

9. The system of claim 6, wherein said manager communicates said control signal from said system processor to a system resource synchronously.

10. The system of claim 6, wherein said system resource is selected from a group consisting of: a north firmware hub, a south firmware hub, a north bridge controller, and a south bridge controller.

11. An article comprising:
a computer-readable medium;
a hardware node operable in said medium, wherein said node having one or more system processors, a service processor, at least two system resources, wherein each of said system resources is located behind a respective bridge controller that interface through a bridge; and
means in the medium for communicating a control signal from said service processor to one of said system resources via one of said system processors said signal being alternately communicated to a first system resource in communication with a first bridge controller and a second system resource in communication with a second bridge controller.

12. The article of claim 11, wherein said medium is a recordable data storage medium.

13. The article of claim 11, further comprising means in the medium for programming said system resource from said service processor.

14. The article of claim 13, wherein said means in the medium for programming said system resource is a probe mode instruction.

15. The article of claim 11, wherein said control signal from said service processor to said system resource is asynchronous.

16. The article of claim 11, wherein said control signal from said system processor to a system resource is synchronous.

17. The article of claim 11, wherein said system resource is selected from a group consisting of: a north firmware hub, a south firmware hub, a north bridge controller, and a south bridge controller.

18. The article of claim 11, wherein said signal represents an access demand to said system resource.

19. A method of managing a system resource comprising:
(a) providing a node with one or more system processors, a service processor, a first system resource in communication with a first bridge controller and a second system resource in communication with a second bridge controller, wherein said first and second bridge controllers interface through a bridge;
(b) communicating a control signal from said service processor to said first system resource through said first bridge controller via one of said system processors in said node, said control signal representing an access request by said service processor to one of said system resources;
(c) wherein the step of communicating said control signal includes said first bridge controller routing said signal to said second bridge controller if said signal has an address in said second system resource.

* * * * *